US012335680B2

(12) United States Patent
Xie

(10) Patent No.: US 12,335,680 B2
(45) Date of Patent: Jun. 17, 2025

(54) SPEAKER

(71) Applicant: AAC Microtech (Changzhou) Co., Ltd., Jiangsu (CN)

(72) Inventor: Zhouye Xie, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 240 days.

(21) Appl. No.: 18/337,422

(22) Filed: Jun. 19, 2023

(65) Prior Publication Data

US 2024/0292146 A1 Aug. 29, 2024

Related U.S. Application Data

(63) Continuation of application No. PCT/CN2023/089531, filed on Apr. 20, 2023.

(30) Foreign Application Priority Data

Feb. 24, 2023 (CN) ......................... 202320314885.7

(51) Int. Cl.
*H04R 1/28* (2006.01)
*H04R 1/02* (2006.01)

(52) U.S. Cl.
CPC ........... *H04R 1/2811* (2013.01); *H04R 1/023* (2013.01); *H04R 1/025* (2013.01)

(58) Field of Classification Search
CPC .... H04R 1/2823; H04R 1/347; H04R 1/2846; H04R 1/2857; H04R 1/28; H04R 1/2803; H04R 1/2807; H04R 1/2811; H04R 1/2869; H04R 1/2873; H04R 1/2884; H04R 1/2888; H04R 2499/11
See application file for complete search history.

(56) References Cited

U.S. PATENT DOCUMENTS 9,838,765 B1 * 12/2017 Li .......................... H04R 1/023

* cited by examiner

*Primary Examiner* — Kile O Blair
(74) *Attorney, Agent, or Firm* — Wiersch Law Group

(57) ABSTRACT

A speaker includes a housing with an accommodating space and a sounder fixed in the accommodating space. A diaphragm is provided in the sounder, the diaphragm divides the accommodating space into a front cavity and a rear cavity, a sound hole communicating with the front cavity and the outside, and a leakage hole communicating with the rear cavity and the outside are formed in the housing. The leakage hole includes a first through hole communicating with the rear cavity, and a second through hole communicating with an end of the first through hole away from the rear cavity and communicating with the outside. Cross-sectional areas of the second through hole increase gradually from the first through hole to the outside. Therefore, a flow resistance of air flowing out from the rear cavity increases. This can improve negative excursions of the diaphragm and achieve better sound generation performance of the speaker.

14 Claims, 4 Drawing Sheets

A—A

SPEAKER

TECHNICAL FIELD

The disclosure belongs to the technical field of electro-acoustic conversion, and particularly relates to a speaker.

BACKGROUND

As a common electronic component in a mobile terminal device (such as a mobile phone), a speaker is applied to convert an electrical signal of the mobile terminal into a sound signal. A leakage hole communicating with the outside is usually formed in the speaker to adjust an internal pressure. This reduces an amplitude of fluctuation of output sound due to nonlinear propagation of air in the speaker, and makes the sound from the speaker more stable.

For the leakage hole in the related art, a flow resistance of air flowing out from the rear cavity is less than a flow resistance of air flowing into the rear cavity. When the speaker works, the air in the rear cavity is gradually depleted to reduce the internal pressure. Under a pressure difference, a diaphragm of the speaker tends to cause negative excursions to affect sound generation performance of the speaker.

SUMMARY

An objective of the disclosure is to provide a speaker, to improve negative excursions of a diaphragm and achieve better sound generation performance of the speaker.

To solve the above technical problem, the disclosure provides a speaker. The speaker includes a housing with an accommodating space and a sounder fixed in the accommodating space. A diaphragm is provided in the sounder. The diaphragm divides the accommodating space into a front cavity and a rear cavity. A sound hole communicating with the front cavity and an outside, and a leakage hole communicating with the rear cavity and the outside are formed in the housing. The leakage hole includes a first through hole communicating with the rear cavity, and a second through hole communicating with an end of the first through hole away from the rear cavity and communicating with the outside. Cross-sectional areas of the second through hole increase gradually from the first through hole to the outside.

As an improvement, all cross-sectional areas of the first through hole in an axial direction are the same.

As an improvement, cross sections of the first through hole and cross sections of the second through hole are circular.

As an improvement, an inner wall of the housing protrudes to form a boss surrounding a periphery of the leakage hole.

As an improvement, the speaker further includes a ventilating mesh attached to the boss and covering the first through hole.

As an improvement, the housing includes a main body portion for accommodating the sounder and an additional portion connected to one side of the main body portion. An inner cavity of the main body portion communicates with an inner cavity of the additional portion to form the accommodating space. The sounder divides the inner cavity of the main body portion into the front cavity and a sub-cavity. The sub-cavity and the inner cavity of the additional portion together form the rear cavity. The leakage hole is formed in the additional portion.

As an improvement, the housing includes an upper shell and a bottom cover covering one side of the upper shell. The upper shell and the bottom cover define the accommodating space. An assembly groove is formed in an inner wall of the upper shell at a position corresponding to the main body portion. An abutting block is provided in an inner wall of the bottom cover at a position corresponding to the main body portion. One side of the sounder is embedded into the assembly groove. A side of the sounder away from the assembly groove abuts against the abutting block.

As an improvement, the sounder is inclined relative to the bottom cover. A side of the abutting block away from the bottom cover is an inclined surface.

As an improvement, the sound hole is formed in one side of the upper shell and communicates with the assembly groove. The leakage hole is formed in the upper shell at a position corresponding to the additional portion.

As an improvement, the speaker includes a conductive sheet with one end electrically connected to the sounder and another end passing through the upper shell. An external end of the conductive sheet is fixed to an outside of the upper shell.

The disclosure has the following beneficial effects. According to the above solutions, the leakage hole includes a first through hole communicating with the rear cavity, and a second through hole communicating with an end of the first through hole away from the rear cavity and communicating with the outside. Cross-sectional areas of the second through hole increase gradually from the first through hole to the outside. Therefore, a flow resistance of air flowing out from the rear cavity increases, which can improve negative excursions of the diaphragm and achieve better sound generation performance of the speaker.

DETAILED DESCRIPTION OF EMBODIMENTS

The disclosure is further described below with reference to the drawings and implementations.

Figure 1:
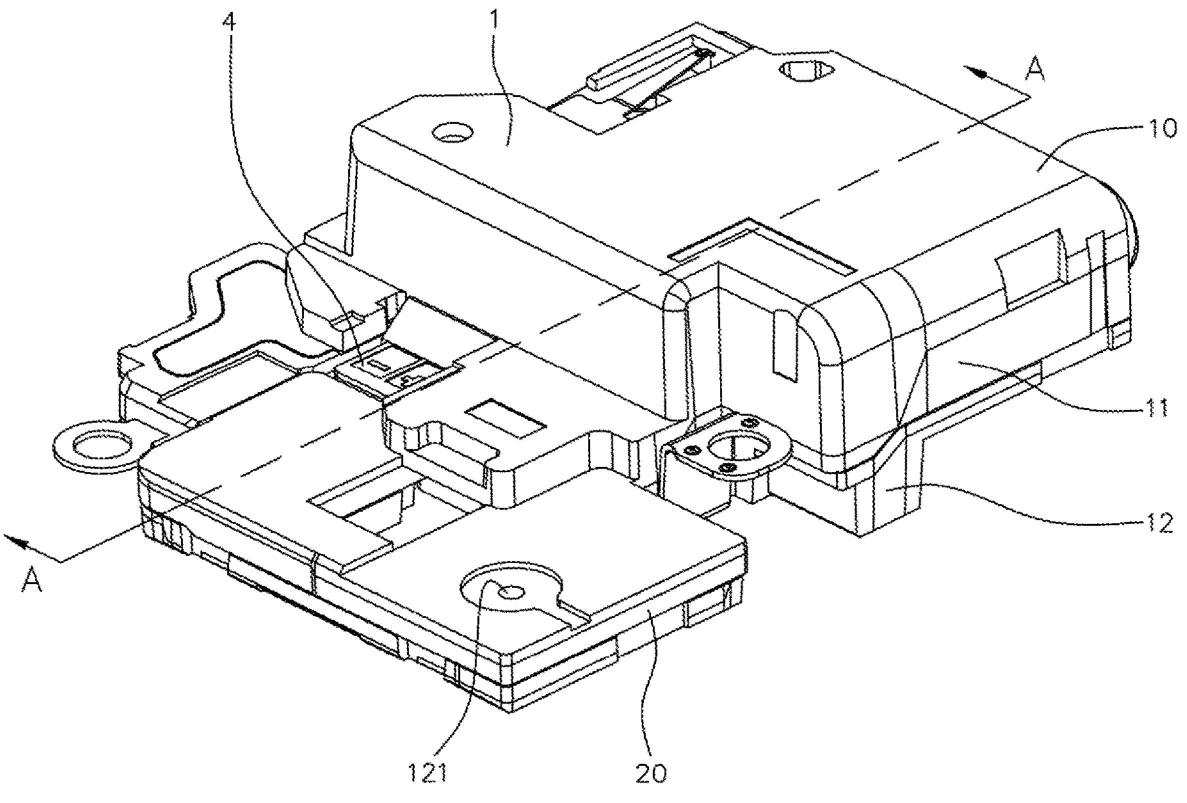
FIG. 1 is an overall structural view of a speaker according to the disclosure.
Figure 2:
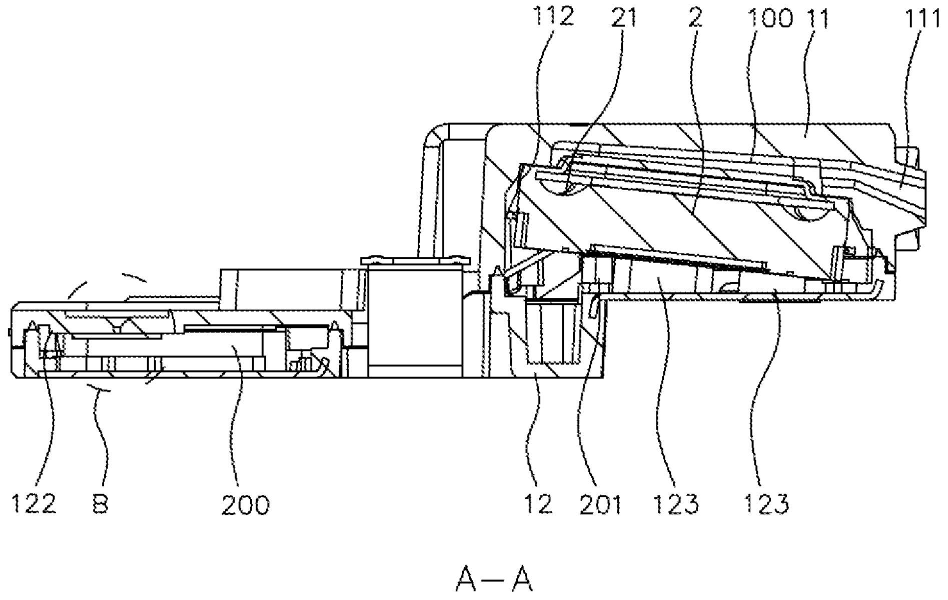
FIG. 2 is a sectional view of a speaker along a direction A-A shown in FIG. 1 according to the disclosure.
Figure 3:
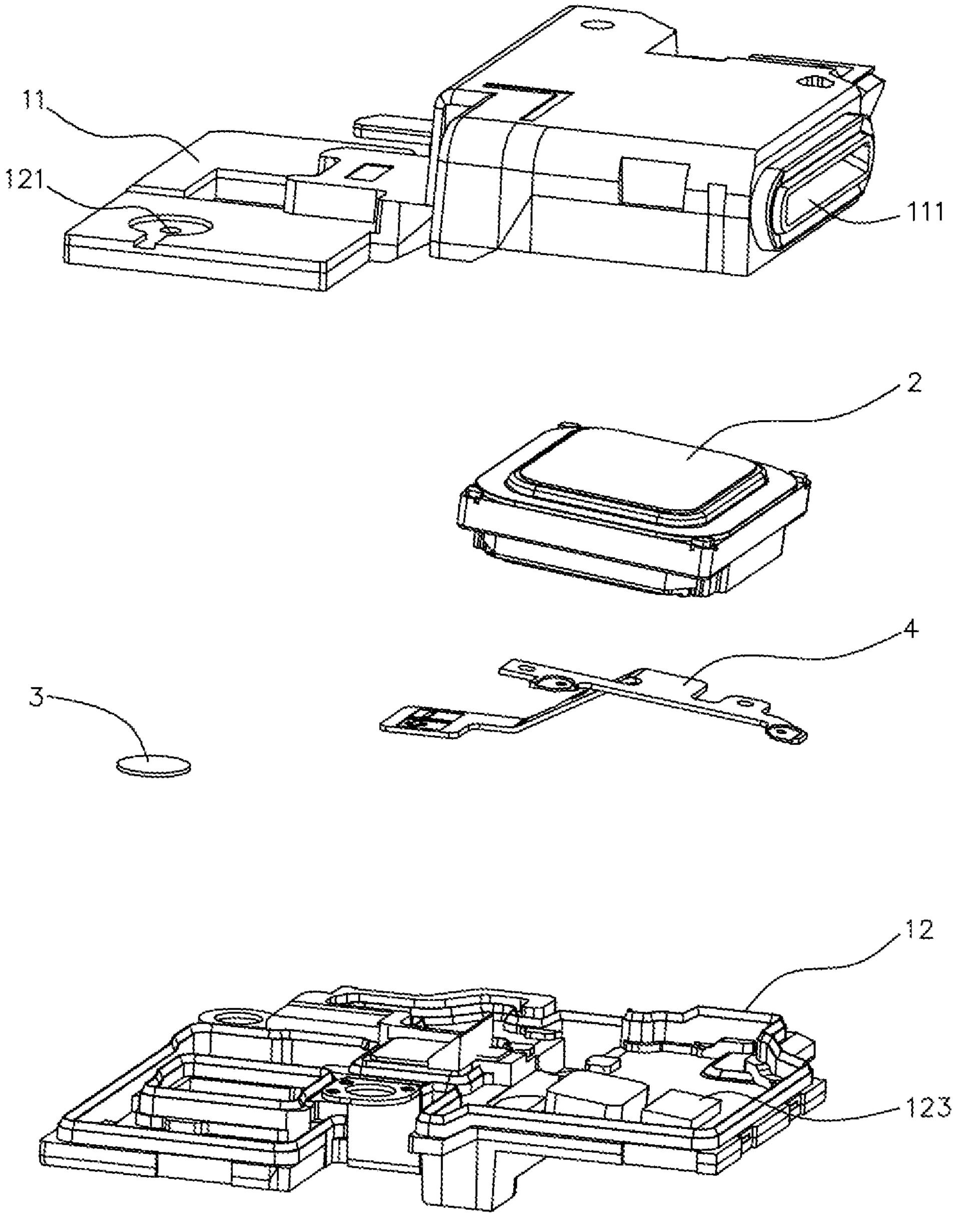
FIG. 3 is an exploded perspective view of a speaker according to the disclosure.
Figure 4:
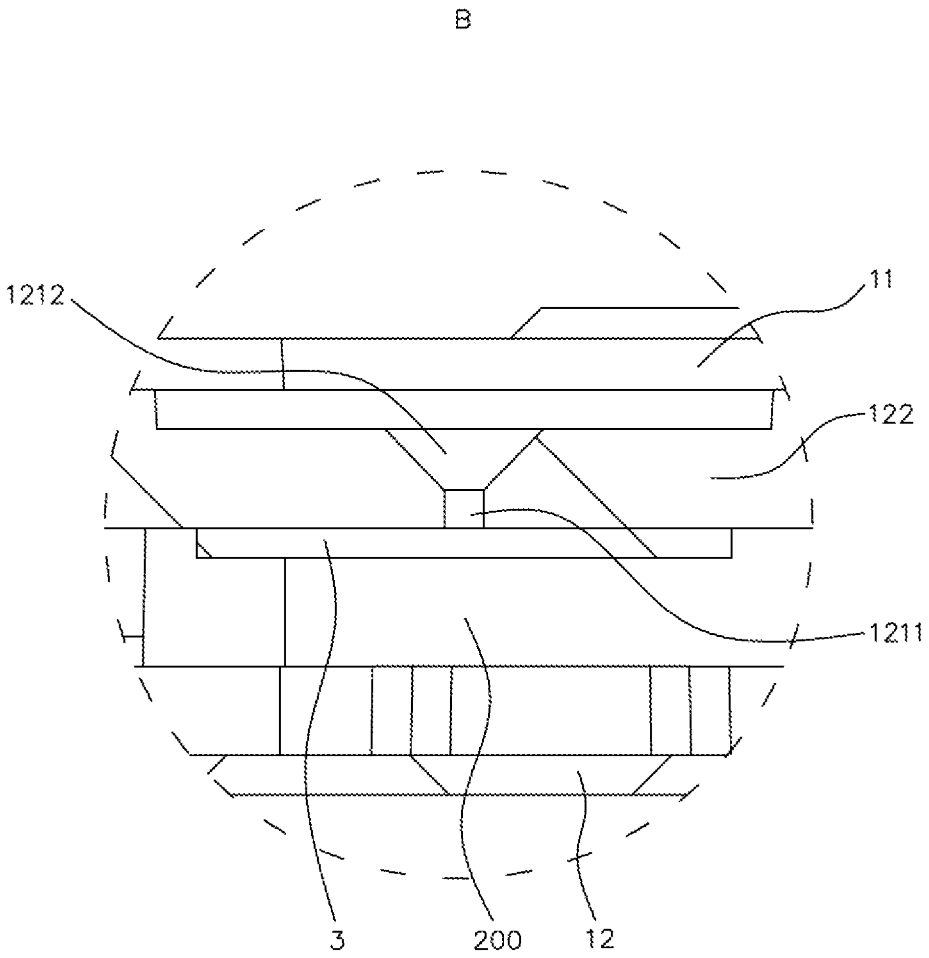
FIG. 4 is an enlarged view of B shown in FIG. 2.

In an embodiment, referring to FIGS. 1-4, a speaker includes a housing 1 with an accommodating space and a sounder 2 fixed in the accommodating space. A diaphragm 21 is provided in the sounder 2. The diaphragm 21 divides the accommodating space into a front cavity 100 and a rear cavity 200. A sound hole 111 communicating with the front cavity 100 and an outside, and a leakage hole 121 communicating with the rear cavity 200 and the outside are formed in the housing 1. The leakage hole 121 includes a first through hole 1211 communicating with the rear cavity 200, and a second through hole 1212 communicating with an end of the first through hole 1211 away from the rear cavity 200 and communicating with the outside. Cross-sectional areas of the second through hole 1212 increase gradually from the first through hole 1211 to the outside.

According to the above solutions, the leakage hole 121 includes a first through hole 1211 communicating with the rear cavity 200, and a second through hole 1212 communicating with an end of the first through hole 1211 away from the rear cavity 200 and communicating with the outside. Cross-sectional areas of the second through hole 1212 increase gradually from the first through hole 1211 to the outside. Therefore, a flow resistance of air flowing out from the rear cavity 200 increases. This can improve negative excursions of the diaphragm 21 and achieve better sound generation performance of the speaker.

In some embodiments, all cross-sectional areas of the first through hole 1211 in an axial direction are the same. In some embodiments, cross sections of the first through hole 1211 are circular. The first through hole 1211 has a cylindrical inner cavity. In some embodiments, the cross-sectional areas of the first through hole 1211 may be a regular polygon, such as a regular triangle, a square, and a regular pentagon. In other words, the inner cavity of the first through hole 1211 is shaped as a corresponding regular polygon prism.

In some embodiments, cross sections of the second through hole 1212 are also circular. The whole second through hole 1212 is trumpet-shaped, with an opening toward the outside. Therefore, when the leakage hole 121 includes the first through hole 1211 and the second through hole 1212, the flow resistance of air flowing out from the rear cavity 200 is less than the flow resistance of air flowing into the rear cavity 200, and the air in the rear cavity 200 is not depleted gradually. This improves the negative excursions of the diaphragm 21 and achieves the better sound generation performance of the speaker.

In some embodiments, an inner wall of the housing 1 protrudes to form a boss 122 surrounding a periphery of the leakage hole 121. Specifically, the boss 122 is cylindrical. The leakage hole 121 is formed in a center of the boss 122.

In some embodiments, the speaker further includes a ventilating mesh 3 attached to the boss 122 and covering the first through hole 1211.

In some embodiments, the housing 1 includes a main body portion 10 for accommodating the sounder 2 and an additional portion 20 connected to one side of the main body portion 10. An inner cavity of the main body portion 10 communicates with an inner cavity of the additional portion 20 to form the accommodating space. The sounder 2 divides the inner cavity of the main body portion 10 into the front cavity 100 and a sub-cavity 201. The sub-cavity 201 and the inner cavity of the additional portion 20 form the rear cavity 200. The leakage hole 121 is formed in the additional portion 20. The additional portion 20 is provided at one side of the main body portion 10. The inner cavity of the additional portion 20 serves as one part of the rear cavity 200. This can increase a size of the rear cavity 200 to achieve the better sound generation performance of the speaker. Moreover, the leakage hole 121 is formed in the additional portion 20, and is away from the sounder 2. In response to air motion of the leakage hole 121, the sound generation effect of the speaker is not affected easily.

In some embodiments, the housing 1 includes an upper shell 11 and a bottom cover 12 covering one side of the upper shell 11. The upper shell 11 and the bottom cover 12 define the accommodating space. An assembly groove 112 is formed in an inner wall of the upper shell 11 at a position corresponding to the main body portion 10. An abutting block 123 is provided in an inner wall of the bottom cover 12 at a position corresponding to the main body portion 10. One side of the sounder 2 is embedded into the assembly groove 112. A side of the sounder 2 away from the assembly groove 112 abuts against abutting block 123. The sounder 2 is inclined relative to the bottom cover 12. A side of the abutting block 123 away from the bottom cover 12 is an inclined surface. Specifically, there are two abutting blocks 123 on the bottom cover 12. One side of each of the two abutting blocks 123 away from the bottom cover 12 is an inclined surface and abuts against one side of the sounder 2. Since the sounder 2 includes one side embedded into the assembly groove 112 and the other side abutting against the abutting block 123, the sounder 2 can be stably fixed in the housing 1. Therefore, the speaker is more reliable.

In some embodiments, the sound hole 111 is formed in one side of the upper shell 11 and communicates with the assembly groove 112. The leakage hole 121 is formed in the upper shell 11 at a position corresponding to the additional portion 20. In some embodiments, the leakage hole 121 may also be formed in the bottom cover 12 at a position corresponding to the additional portion 20. In some embodiments, the leakage hole 121 may further be formed in the bottom cover 12 at a position corresponding to the main body portion 10.

The speaker includes a conductive sheet 4 with one end electrically connected to the sounder 2 and another end passing through the upper shell 11. An external end of the conductive sheet 4 is fixed to an outside the upper shell 11. The sounder 2 may be powered through the external end of the conductive sheet 4 to ensure reliability of the speaker in work.

The above described are merely implementations of the disclosure. It should be noted here that those of ordinary skill in the art may make improvements without departing from the concept of the disclosure, but such improvements should fall within the protection scope of the disclosure.

What is claimed is:

1. A speaker, comprising a housing with an accommodating space and a sounder fixed in the accommodating space, wherein a diaphragm is provided in the sounder; the diaphragm divides the accommodating space into a front cavity and a rear cavity; a sound hole communicating with the front cavity and an outside, and a leakage hole communicating with the rear cavity and the outside are formed in the housing; the leakage hole comprises a first through hole communicating with the rear cavity, and a second through hole communicating with an end of the first through hole away from the rear cavity and communicating with the outside; and cross-sectional areas of the second through hole increase gradually from the first through hole to the outside.

2. The speaker as described in claim 1, wherein all cross-sectional areas of the first through hole in an axial direction are the same.

3. The speaker as described in claim 2, wherein cross sections of the first through hole and cross sections of the second through hole are circular.

4. The speaker as described in claim 3, wherein the housing comprises a main body portion for accommodating the sounder and an additional portion connected to one side of the main body portion; an inner cavity of the main body portion communicates with an inner cavity of the additional portion to form the accommodating space; the sounder divides the inner cavity of the main body portion into the front cavity and a sub-cavity; the sub-cavity and the inner cavity of the additional portion together form the rear cavity; and the leakage hole is formed in the additional portion.

5. The speaker as described in claim 2, wherein the housing comprises a main body portion for accommodating the sounder and an additional portion connected to one side of the main body portion; an inner cavity of the main body portion communicates with an inner cavity of the additional portion to form the accommodating space; the sounder divides the inner cavity of the main body portion into the front cavity and a sub-cavity; the sub-cavity and the inner cavity of the additional portion together form the rear cavity; and the leakage hole is formed in the additional portion.

6. The speaker as described in claim 1, wherein an inner wall of the housing protrudes to form a boss surrounding a periphery of the leakage hole.

7. The speaker as described in claim 6, further comprising a ventilating mesh attached to the boss and covering the first through hole.

8. The speaker as described in claim 6, wherein the housing comprises a main body portion for accommodating the sounder and an additional portion connected to one side of the main body portion; an inner cavity of the main body portion communicates with an inner cavity of the additional portion to form the accommodating space; the sounder divides the inner cavity of the main body portion into the front cavity and a sub-cavity; the sub-cavity and the inner cavity of the additional portion together form the rear cavity; and the leakage hole is formed in the additional portion.

9. The speaker as described in claim 1, wherein the housing comprises a main body portion for accommodating the sounder and an additional portion connected to one side of the main body portion; an inner cavity of the main body portion communicates with an inner cavity of the additional portion to form the accommodating space; the sounder divides the inner cavity of the main body portion into the front cavity and a sub-cavity; the sub-cavity and the inner cavity of the additional portion together form the rear cavity; and the leakage hole is formed in the additional portion.

10. The speaker as described in claim 9, wherein the housing comprises an upper shell and a bottom cover covering one side of the upper shell; the upper shell and the bottom cover define the accommodating space; an assembly groove is formed in an inner wall of the upper shell at a position corresponding to the main body portion; an abutting block is provided in an inner wall of the bottom cover at a position corresponding to the main body portion; one side of the sounder is embedded into the assembly groove; and a side of the sounder away from the assembly groove abuts against the abutting block.

11. The speaker as described in claim 10, wherein the sounder is inclined relative to the bottom cover, and a side of the abutting block away from the bottom cover is an inclined surface.

12. The speaker as described in claim 10, wherein the sound hole is formed in one side of the upper shell and communicates with the assembly groove; and the leakage hole is formed in the upper shell at a position corresponding to the additional portion.

13. The speaker as described in claim 10, wherein the speaker comprises a conductive sheet with one end electrically connected to the sounder and another end passing through the upper shell; and an external end of the conductive sheet is fixed to an outside of the upper shell.

14. The speaker as described in claim 1, wherein the housing comprises a main body portion for accommodating the sounder and an additional portion connected to one side of the main body portion; an inner cavity of the main body portion communicates with an inner cavity of the additional portion to form the accommodating space; the sounder divides the inner cavity of the main body portion into the front cavity and a sub-cavity; the sub-cavity and the inner cavity of the additional portion together form the rear cavity; and the leakage hole is formed in the additional portion.

* * * * *